United States Patent
Funk et al.

(10) Patent No.: US 9,574,483 B2
(45) Date of Patent: Feb. 21, 2017

(54) SYSTEM AND METHOD FOR CONTROLLING EXHAUST GAS TEMPERATURE DURING PARTICULATE MATTER FILTER REGENERATION

(75) Inventors: Sarah Funk, Canton, MI (US);
Thomas Larose, Jr., Redford, MI (US);
Patrick Barasa, Ann Arbor, MI (US);
Michael V. Taylor, Wolverine Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 517 days.

(21) Appl. No.: 12/687,442

(22) Filed: Jan. 14, 2010

(65) Prior Publication Data
US 2011/0167803 A1    Jul. 14, 2011

(51) Int. Cl.
| F01N 3/00 | (2006.01) |
| F01N 9/00 | (2006.01) |
| F01N 3/025 | (2006.01) |
| F01N 3/035 | (2006.01) |
| F02D 41/02 | (2006.01) |

(52) U.S. Cl.
CPC ............. F01N 9/002 (2013.01); F01N 3/0253 (2013.01); F01N 3/035 (2013.01); F02D 41/029 (2013.01); F01N 2610/03 (2013.01); Y02T 10/47 (2013.01)

(58) Field of Classification Search
CPC ........ F01N 3/0253; F01N 3/035; F01N 9/002; F01N 2610/03; F02D 41/029; Y02T 10/47
USPC .................. 60/274, 286, 285, 295, 297, 311, 303, 60/276
See application file for complete search history.

(56) References Cited

U.S. PATENT DOCUMENTS

| 5,456,079 A | 10/1995 | Langen |
| 6,634,170 B2 * | 10/2003 | Hiranuma et al. ............... 60/295 |
| 6,651,618 B1 * | 11/2003 | Coleman et al. ............. 123/305 |
| 7,065,959 B2 * | 6/2006 | Ueno et al. ..................... 60/295 |
| 8,078,392 B2 * | 12/2011 | Yahata et al. ................. 701/123 |
| 8,245,501 B2 * | 8/2012 | He et al. .......................... 60/286 |
| 2005/0284131 A1 * | 12/2005 | Forthmann et al. ............ 60/285 |
| 2006/0236686 A1 * | 10/2006 | Rellecati ................. F01N 3/023 60/311 |
| 2007/0056264 A1 * | 3/2007 | Hou et al. ........................ 60/274 |
| 2007/0068148 A1 * | 3/2007 | Kurata et al. ................... 60/297 |
| 2008/0040014 A1 * | 2/2008 | Yahata et al. ................... 701/99 |
| 2009/0071129 A1 * | 3/2009 | Gonze et al. ................... 60/286 |

(Continued)

FOREIGN PATENT DOCUMENTS

| CN | 1048581 A | 1/1991 |
| EP | 0405310 A2 | 1/1991 |

(Continued)

*Primary Examiner* — Thomas Denion
*Assistant Examiner* — Matthew T Largi

(57) ABSTRACT

An engine control system includes an injection determination module, a correction factor determination module, and a regeneration control module. The injection determination module determines a desired amount of hydrocarbons (HC) to inject into exhaust gas produced by an engine based a flow rate of the exhaust gas. The correction factor determination module determines a correction factor for the desired amount of HC based on engine speed and engine load. The regeneration control module controls injection of an adjusted amount of HC into the exhaust gas during regeneration of a particulate matter filter, wherein the adjusted amount of HC is based on the desired amount of HC and the correction factor.

19 Claims, 3 Drawing Sheets

(56) References Cited

U.S. PATENT DOCUMENTS

2009/0133387 A1* 5/2009 Nishizawa ............ F02D 41/029
          60/286
2009/0165444 A1* 7/2009 Oosumi .......................... 60/286
2010/0132334 A1* 6/2010 Duclos et al. .................. 60/286

FOREIGN PATENT DOCUMENTS

| EP | 1380742 | * | 1/2004 | |
|----|---------|---|--------|---|
| EP | 1533500 A1 | | 5/2005 | |
| FR | 0651361 | * | 4/2006 | ............ F01N 3/025 |
| FR | 2931876 | | 12/2009 | |

* cited by examiner

SYSTEM AND METHOD FOR CONTROLLING EXHAUST GAS TEMPERATURE DURING PARTICULATE MATTER FILTER REGENERATION

FIELD

The present disclosure relates to internal combustion engines, and more particularly to a system and method for controlling exhaust gas temperature during regeneration of a particulate matter filter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combine air and fuel to create an air/fuel (A/F) mixture that combusted within a plurality of cylinders. The combustion of the A/F mixture within the cylinders drives pistons which rotatably turn a crankshaft generating drive torque. Air may be drawn into the cylinders and compressed using the pistons. Fuel may then be combined with (i.e., injected into) the compressed air causing the pressurized A/F mixture to combust (e.g., a compression ignition, or CI). For example, CI engines include diesel engines.

Alternatively, the air may be mixed with fuel to create the A/F mixture prior to compression. The A/F mixture may then be compressed until the A/F mixture reaches a critical pressure and/or temperature and automatically ignites (e.g., homogeneous charge compression ignition, or HCCI). HCCI engines, however, may also "assist" ignition of the A/F mixture using spark from spark plugs. In other words, HCCI engines may ignite the A/F mixture using spark assist based depending on engine operating conditions. For example, HCCI engines may use spark assist at low engine loads and HCCI at all other operating conditions.

Exhaust gas produced during combustion may be expelled from the cylinders through an exhaust manifold and an exhaust treatment system. The exhaust gas may include carbon monoxide (CO) and hydrocarbons (HC). The exhaust gas may also include nitrogen oxides (NOx) due to the higher combustion temperatures of CI engines and HCCI engines compared to spark ignition (SI) engines. Thus, the exhaust treatment system may treat the exhaust gas to remove CO, HC, and/or NOx. For example, the exhaust treatment system may include, but is not limited to, at least one of an oxidation catalyst (OC), a particulate matter (PM) filter, a selective catalytic reduction (SCR) system, NOx absorbers/adsorbers, and catalytic converters.

SUMMARY

An engine control system includes an injection determination module, a correction factor determination module, and a regeneration control module. The injection determination module determines a desired amount of hydrocarbons (HC) to inject into exhaust gas produced by an engine based a flow rate of the exhaust gas. The correction factor determination module determines a correction factor for the desired amount of HC based on engine speed and engine load. The regeneration control module controls injection of an adjusted amount of HC into the exhaust gas during regeneration of a particulate matter filter, wherein the adjusted amount of HC is based on the desired amount of HC and the correction factor.

A method includes determining a desired amount of hydrocarbons (HC) to inject into exhaust gas produced by an engine based a flow rate of the exhaust gas, determining a correction factor for the desired amount of HC based on engine speed and engine load, and controlling injection of an adjusted amount of HC into the exhaust gas during regeneration of a particulate matter filter, wherein the adjusted amount of HC is based on the desired amount of HC and the correction factor.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
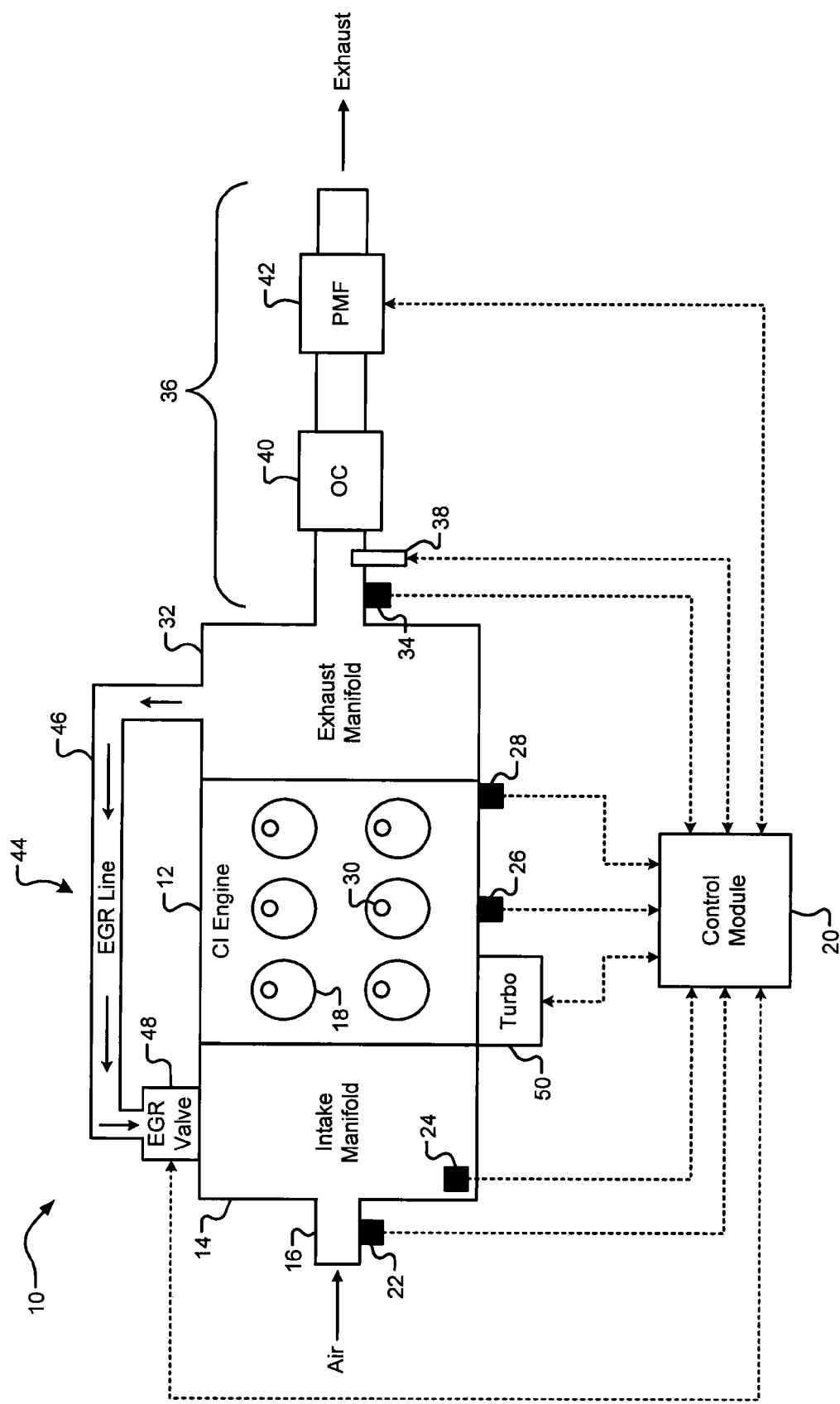
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory including one or more software or firmware programs, and/or a combinational logic circuit.

Compression ignition (CI) (e.g., diesel) and homogeneous charge compression ignition (HCCI) engines may include similar exhaust treatment systems. More specifically, exhaust treatment systems for CI and HCCI engines may include an oxidation catalyst (OC) located before (i.e., upstream from) a particulate matter (PM) filter. The OC oxidizes carbon monoxide (CO) and hydrocarbons (HC) to form carbon dioxide ($CO_2$) and water ($H_2O$). The PM filter, on the other hand, removes PM from the exhaust gas.

The PM filter may remove PM from the exhaust gas until the PM filter is saturated. In other words, the saturation condition may correspond to when the PM filter is full of PM (e.g., soot), after which a regeneration cycle may begin. The regeneration cycle may introduce HC into the exhaust gas. The HC in the exhaust gas may be catalyzed by the OC in an exothermic reaction that generates heat and increases exhaust gas temperature (EGT). The increased EGT at the outlet of the OC (i.e., at the inlet of the PM) may burn and/or breakdown the PM trapped in the PM filter, thus "regenerating" the PM filter.

Exhaust treatment systems, therefore, may further include one or more HC injectors that inject HC (e.g., fuel) upstream from an OC in an exhaust stream. Alternatively, exhaust treatment systems may perform post-combustion fuel injection to introduce HC into the exhaust gas. Conventional control systems control injection of HC into the exhaust stream during PM filter regeneration based on exhaust flow. The exhaust gas, however, may include unburned HC due to incomplete combustion. The unburned HC combined with the injected HC may result in an excessive amount of HC. The excessive amount of HC may be catalyzed by the OC, increasing the EGT above a temperature threshold. These "temperature overshoots" may result in decreased fuel economy (i.e., excessive HC injection), increased emissions, and/or damage to components of the exhaust treatment system (e.g., the PM filter).

Therefore, a system and method are presented that more accurately model the amount of HC in the exhaust stream (i.e., unburned HC and injected HC) to prevent temperature overshoots. Accordingly, the system and method may determine an amount of HC injection based on exhaust flow, engine speed, and engine load. More specifically, the system and method may determine the amount of HC injection based on exhaust flow, and then adjust the amount of HC injection by a correction factor that is based on engine speed and engine load. For example, the system and method may include a lookup table that stores a plurality of adjustment values according to various engine speeds and engine loads.

Referring now to FIG. 1, an engine system 10 includes a CI engine 12. For example only, the engine 12 may be a diesel engine or an HCCI engine. The engine 12 combusts an air/fuel (A/F) mixture to produce drive torque. Air is drawn into an intake manifold 14 through an inlet 16. A throttle (not shown) may be included to regulate air flow into the intake manifold 14. Air within the intake manifold 14 is distributed into a plurality of cylinders 18. While six cylinders 18 are shown, it can be appreciated that the engine 12 may include other numbers of cylinders.

Air is passed from the inlet 16 through an intake mass airflow (IMAF) sensor 22. The IMAF sensor 22 generates an IMAF signal that indicates a rate of air flowing through the IMAF sensor 22. For example, the IMAF signal may indicate or be used to determine a load on the engine 12. An intake manifold pressure (MAP) sensor 24 is positioned in the intake manifold 14 between the inlet 16 and the engine 12. The MAP sensor 24 generates a MAP signal that indicates air pressure in the intake manifold 14.

An engine crankshaft (not shown) rotates at engine speed or a rate that is proportional to engine speed. A crankshaft speed (CS) sensor 26 measures a rotational speed of the crankshaft. For example only, the CS sensor 26 may be a variable reluctance sensor. Drive torque from the engine crankshaft may be transferred to a driveline of a vehicle (e.g., wheels) via a transmission (not shown). A transmission output shaft speed (TOSS) sensor 28 measures a rotational speed of the output shaft of a transmission (not shown). In other words, the measurement from the TOSS sensor 28 may indicate vehicle speed. Both engine speed and vehicle speed, however, may be measured or calculated using other suitable sensors and/or methods.

A control module 20 may actuate fuel injectors 30 to inject fuel directly into the cylinders 18 (i.e., direct fuel injection). Alternatively, however, the fuel injectors 30 may inject fuel via intake ports of the cylinders 18 (i.e., port fuel injection). A piston (not shown) compresses and combusts the A/F mixture within the cylinder 18. The piston drives the crankshaft during a power stroke to produce drive torque. In one embodiment, the cylinders 18 may include spark plugs (not shown) (e.g., for spark assist in an HCCI engine). The fuel injectors 30 may also inject fuel into the cylinders 18 after combustion of the A/F mixture (i.e., post-combustion injection) to introduce hydrocarbons (HC) into exhaust gas.

The exhaust gas resulting from the combustion within the cylinder 18 is vented from the cylinders 18 into an exhaust manifold 32. An exhaust mass air flow (EMAF) sensor 34 generates an EMAF signal that indicates a rate of air flowing through the EMAF sensor 34. For example, the EMAF signal may indicate or be used to determine exhaust flow through an exhaust treatment system 36. Thus, the EMAF sensor 34 may be located between the exhaust manifold 32 and the exhaust treatment system 36.

The exhaust treatment system 36 may treat the exhaust gas. The exhaust treatment system 36 may include an HC injector 38, an OC 40, and a PM filter 42. The HC injector 38 selectively injects hydrocarbons into an exhaust stream. As previously described, however, the fuel injectors 30 may perform post-combustion injection to introduce HC into the exhaust gas. The OC 40 oxidizes CO and HC in the exhaust gas. The PM filter 42 removes PM from the exhaust gas. The exhaust treatment system 36 may further include one or more temperature and/or NOx sensors (not shown) that measure EGT and/or exhaust gas NOx concentration, respectively.

The control module 20 communicates with and/or controls various components of the engine system 10. The control module 20 may receive signals from the IMAF sensor 22, the MAP sensor 24, the CS sensor 26, the TOSS sensor 28, and the EMAF sensor 34. The control module 20 may communicate with the PM filter 42 to determine when a regeneration cycle is required. Alternatively, the control module 20 may determine that regeneration of the PM filter 42 is required based on other parameters and/or modeling. For example, the control module 20 may determine that regeneration of the PM filter 42 is required when exhaust flow is less than a predetermined exhaust flow threshold (i.e., the PM filter 42 is restricted by PM).

The control module 20 may also control a throttle (not shown), the fuel injectors 30, the HC injector 38, and an exhaust gas recirculation (EGR) valve 48 (discussed in more detail below). More specifically, the control module 20 may actuate the fuel injectors 30 (i.e., post-combustion injection) or the HC injector 38 to control EGT and thus may control regeneration of the PM filter 42. The control module 20 may also implement the system and method of the present disclosure to prevent temperature overshoot during regeneration of the PM filter 42.

The engine system 10 may further include an exhaust gas recirculation (EGR) system 44. The EGR system 44 includes the EGR valve 48 and an EGR line 46. The EGR system 44 may introduce a portion of exhaust gas from the exhaust manifold 32 into the intake manifold 14. The EGR valve 48 may be mounted on the intake manifold 14. The EGR line 46 may extend from the exhaust manifold 32 to the EGR valve 48, providing communication between the exhaust manifold 32 and the EGR valve 48. As previously described, the control module 20 may actuate the EGR valve 48 to increase or decrease an amount of exhaust gas introduced into the intake manifold 14.

The engine 12 may also include a turbocharger 50. The turbocharger 50 may be driven by the exhaust gas received through a turbine inlet. For example only, the turbocharger 50 may include a variable nozzle turbine. The turbocharger 50 increases airflow into the intake manifold to cause an increase in intake manifold pressure (i.e., boost pressure). The control module 20 may actuate the turbocharger 50 to selectively restrict the flow of the exhaust gas, thereby controlling the boost pressure.

Figure 2:
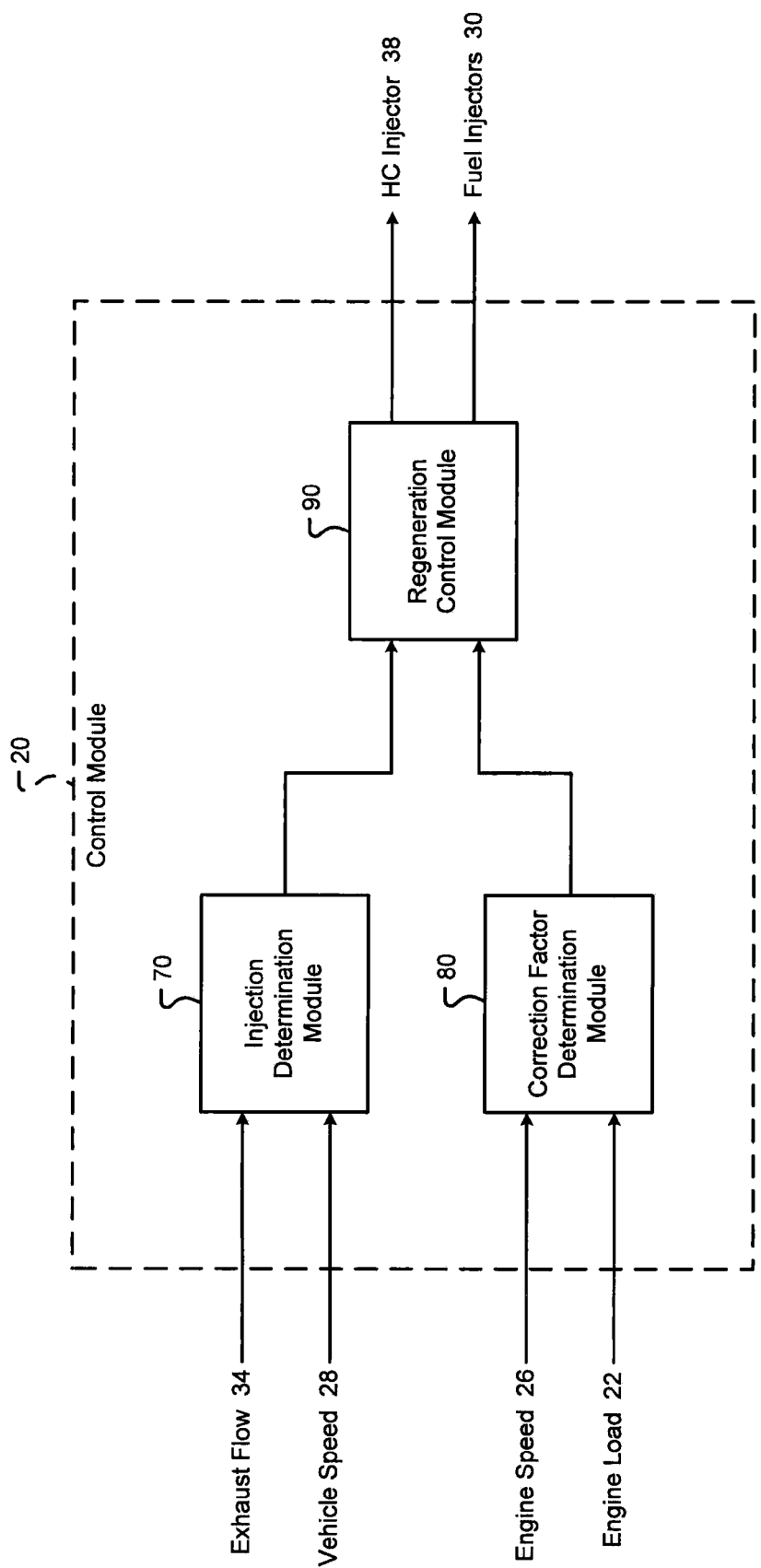
FIG. 2 is a functional block diagram of an exemplary control module according to the present disclosure.

Referring now to FIG. 2, the control module 20 is shown in more detail. The control module 20 may include an injection determination module 70, a correction factor determination module 80, and a regeneration control module 90. The injection determination module 70 receives signals from the EMAF sensor 34 and the TOSS sensor 28 indicating exhaust flow and vehicle speed, respectively. The injection determination module 70 determines an amount of HC injection required for regeneration of the PM filter 42.

The correction factor determination module 80 receives signals from the IMAF sensor 22 and the CS sensor 26 indicating engine load and engine speed, respectively. The correction factor determination module 80 determines a correction factor for the amount of HC injection determined by the injection determination module 70. In other words, the correction factor may correspond to an adjustment to the amount of HC injection to prevent temperature overshoots during regeneration of the PM filter. For example, the correction factor determination module 80 may include a lookup table that includes a plurality of correction factors relating to various engine loads and/or various engine speeds.

The regeneration control module 90 receives the determined amount of HC injection from the injection determination module 70 and the correction factor from the correction factor determination module 80. The regeneration control module 90 generates a control signal for the fuel injectors 30 or the HC injector 38 to control an amount of HC injected into the exhaust gas during regeneration of the PM filter 42. For example, the regeneration control module 90 may generate the control signal based on a sum of the determined amount of HC injection and the correction factor.

In other words, the correction factor may be negative to decrease HC injection and thus prevent temperature overshoot. The correction factor, however, may also be positive. In other words, the correction factor may either increase HC injection (i.e., during particular operating conditions), or the correction factor may be subtracted from the determined amount of HC injection. Additionally or alternatively, for example only, the control signal may be determined based on a weighted sum of the determined amount of HC injection and the correction factor.

Figure 3:
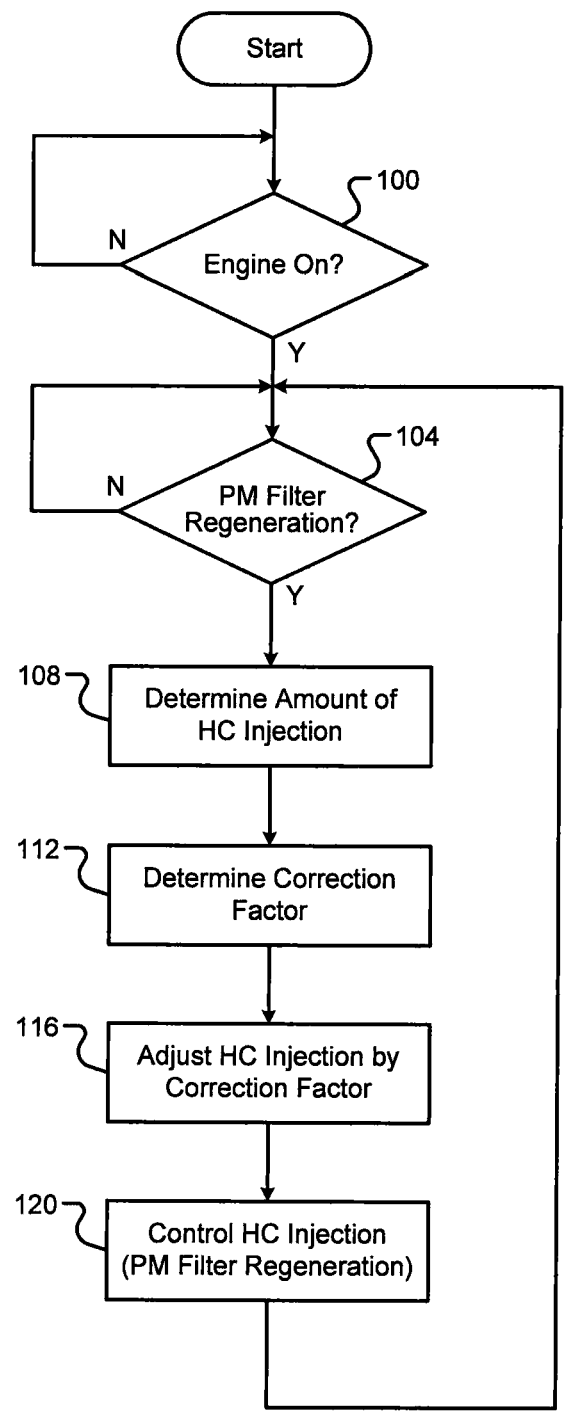
FIG. 3 is a flow diagram of a method for controlling exhaust gas temperature (EGT) during particulate matter (PM) filter regeneration according to the present disclosure.

Referring now to FIG. 3, a method for compensating for the exothermic effects the OC 40 during regeneration of the PM filter 42 begins in step 100. In step 100, the control module 20 determines whether the engine 12 is on. If true, control may proceed to step 104. If false, control may return to step 100.

In step 104, the control module 20 may determine whether a regeneration cycle of the PM filter 42 is required. For example, a regeneration cycle of the PM filter 42 may be required when exhaust flow is less than a predetermined exhaust flow threshold. If true, control may proceed to step 108. If false, control may return to step 104.

In step 108, the control module 20 may determine an amount of HC injection for regeneration of the PM filter 42. For example, the amount of HC injection may be based on exhaust flow and/or vehicle speed. In step 112, the control module 20 determines a correction factor for the amount of HC injection. For example, the correction factor may be based on engine load and/or engine speed.

In step 116, the control module 20 may adjust the determined amount of HC injection using the correction factor. For example, the adjustment may include one of a sum, a weighted sum, and a difference. In step 120, the control module 20 may control HC injection based on the adjusted amount of HC injection. For example, the control module 20 may generate a control signal for the fuel injectors 30 or the HC injector 38 to control the amount of HC injected into the exhaust gas. Control may then return to step 104.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
   a first electronic circuit configured to determine a desired amount of hydrocarbons (HC) to inject into exhaust gas produced by an engine based on a flow rate of the exhaust gas;
   a second electronic circuit configured to:
      selectively determine a positive correction factor based on engine speed and engine load; and
      selectively determine a negative correction factor based on the engine speed and the engine load; and
   a third electronic circuit configured to:
      determine an amount of HC to inject into the exhaust gas during regeneration of a particulate matter filter based on a sum of the desired amount of HC and one of the positive and negative correction factors; and
      actuate at least one of an HC injector and a fuel injector to inject the determined amount of HC into the exhaust gas during regeneration of a particulate matter filter, wherein the HC injector is located in an exhaust system of the engine and the fuel injector is located in the engine.

2. The engine control system of claim 1, wherein the second electronic circuit is configured to determine the one of the positive and negative correction factors using a lookup table, wherein the lookup table includes a plurality of correction factors relating to engine speed and engine load.

3. The engine control system of claim 1, further comprising:
   an intake mass air flow sensor that measures a rate of airflow into an intake manifold of the engine, wherein the engine load is based on the rate of airflow into the intake manifold of the engine.

4. The engine control system of claim 3, further comprising the at least one of the HC injector and the fuel injector.

5. The engine control system of claim 1, further comprising:
   an exhaust mass air flow sensor that measures the flow rate of the exhaust gas at a location downstream from an exhaust manifold and upstream from an oxidation catalyst.

6. The engine control system of claim 1, wherein the third electronic circuit is configured to control the amount of HC injected into the exhaust gas by one of actuating the HC injector and actuating the fuel injector during a post-combustion period, wherein the HC injector is located downstream from an exhaust manifold and upstream from an oxidation catalyst, and wherein the fuel injector correspond to a cylinder in the engine.

7. The engine control system of claim 1, wherein the second electronic circuit determines the one of the positive and negative correction factors based on an amount of unburned HC in the exhaust gas.

8. The engine control system of claim 1, wherein the second electronic circuit is configured to determine the one of the positive and negative correction factors such that the amount of HC injected into the exhaust gas causes a temperature of the exhaust gas to increase to less than or equal to a predetermined temperature.

9. The engine control system of claim 8, wherein the predetermined temperature is indicative of a maximum exhaust gas temperature that does not cause damage to the particulate matter filter.

10. The engine control system of claim 1, wherein the first, second, and third electronic circuits include at least one of an Application Specific Integrated Circuit (ASIC), a processor and memory including one or more programs, and a combinational logic circuit.

11. The engine control system of claim 1, further comprising the at least one of the HC injector and the fuel injector.

12. A method, comprising:
   determining a desired amount of hydrocarbons (HC) to inject into exhaust gas produced by an engine based on a flow rate of the exhaust gas;
   selectively determining a positive correction factor based on engine speed and engine load;
   selectively determining a negative correction factor based on engine speed and engine load;
   determining an amount of HC to inject into the exhaust gas during regeneration of a particulate matter filter based on a sum of the desired amount of HC and one of the positive and negative correction factors; and
   injecting the determined amount of HC into the exhaust gas during regeneration of the particulate matter filter.

13. The method of claim 12, further comprising:
   determining the one of the positive and negative correction factors using a lookup table, wherein the lookup table includes a plurality of correction factors relating to engine speed and engine load.

14. The method of claim 12, further comprising:
   measuring a rate of airflow into an intake manifold of the engine, wherein the engine load is based on the rate of airflow into the intake manifold of the engine.

15. The method of claim 12, further comprising:
   measuring the flow rate of the exhaust gas at a location downstream from an exhaust manifold and upstream from an oxidation catalyst.

16. The method of claim 12, further comprising:
   controlling the amount of HC injected into the exhaust gas by one of actuating an HC injector and actuating a fuel injector during a post-combustion period, wherein the HC injector is located downstream from an exhaust manifold and upstream from an oxidation catalyst, and wherein the fuel injector correspond to a cylinder in the engine.

17. The method of claim 12, further comprising determining the one of the positive and negative correction factors based on an amount of unburned HC in the exhaust gas.

18. The method of claim 12, further comprising determining the one of the positive and negative correction factors such that the amount of HC injected into the exhaust gas causes a temperature of the exhaust gas to increase to less than or equal to a predetermined temperature.

19. The method of claim 18, wherein the predetermined temperature is indicative of a maximum exhaust gas temperature that does not cause damage to the particulate matter filter.

* * * * *